Jan. 13, 1925.
A. LOUGHEED
DIFFERENTIAL DRIVE
Filed May 6, 1924
1,522,730
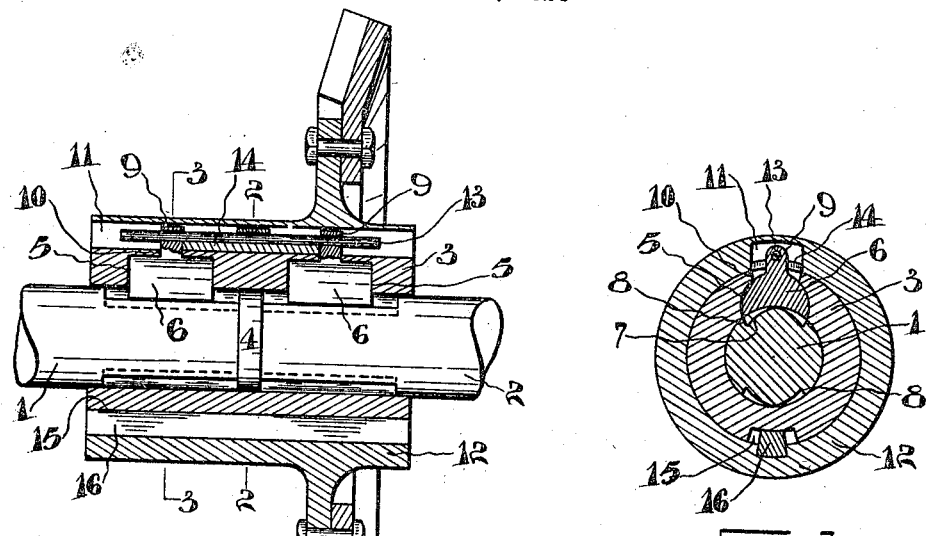
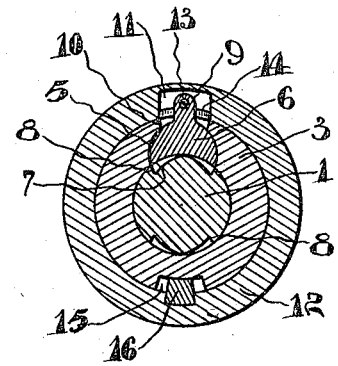
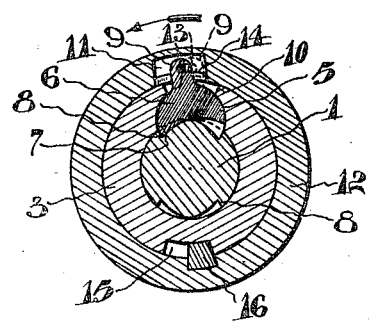
INVENTOR.
A. Lougheed.
BY J. Edward Maybee.
ATTY.

Patented Jan. 13, 1925.

1,522,730

UNITED STATES PATENT OFFICE.

AARON LOUGHEED, OF PORT ARTHUR, ONTARIO, CANADA.

DIFFERENTIAL DRIVE.

Application filed May 6, 1924. Serial No. 711,341.

*To all whom it may concern:*

Be it known that I, AARON LOUGHEED, of the city of Port Arthur, in the Province of Ontario, Canada, a subject of the King of Great Britain, have invented certain new and useful Improvements in Differential Drives, of which the following is a specification.

This invention relates to means for driving two alined rotatable parts so that, when necessary, either one may rotate at greater speed than the other.

At present it is common to employ gearing as the differential connection, but constructions are expensive and complicated. As an alternative ratchet and pawl connections have been used, but as usually constructed, such drives are weak and the clicking of the pawls is objectionable.

My object therefore is to devise a differential drive which will possess the simplicity and cheapness of the ratchet and pawl construction without sacrificing the major advantages of the gear construction.

I attain my objects by means of the constructions hereinafter described and illustrated in the accompanying drawings in which Fig. 1 is a longitudinal section of my improved drive;

Fig. 2 a section on the line 2—2 in Fig. 1;

Fig. 3 a section on the line 3—3 in Fig. 1 showing the pawl in neutral position; and Fig. 4 a similar view showing the pawl engaged with the shaft.

In the drawings like numerals of reference indicate corresponding parts in the different figures.

1 and 2 are two shafts or axles in axial alinement. Fitted over the adjacent shaft ends is an inner sleeve 3. Between the ends of the shafts a suitable washer 4 is fitted. The sleeve 3 has two segmento cylindrical recesses 5 formed therein, preferably in alinement. In each recess is fitted a segmento cylindrical pawl 6. The inner side of this pawl is cut away so that when the pawl is in the position shown in Fig. 3, its ends 7 lie substantially at the periphery of the adjacent shaft. Preferably this inner surface is curved concentric with the shaft. In the adjacent shaft are formed one or more pairs of oppositely directed ratchet teeth 8 so positioned that the pawl may be rocked in the recess in the sleeve to bring either one end or the other into engagement with the corresponding ratchet tooth. In Fig. 4 one end is shown thus engaged so that when the sleeve is rotated in the direction of the arrow, the shaft will be driven. Each pawl has an arm 9 formed thereon which extends through a slot 10 in the sleeve 3 into a recess 11 formed in the outer or driving sleeve 12 fitted over the sleeve 3. It is evident that if the arms have an operative connection with the driving sleeve 12 that the pawls may be rocked to engage the ratchet teeth of the shaft whereby the latter may be driven in one direction or the other according to the direction of rotation of the driving sleeve. The connection between each arm and the driving sleeve is a resilient one for a purpose which will hereinafter appear. In the preferred construction this connection is formed by means of a spring rod 13 passing through each arm. Intermediate its ends the spring rod passes through a carrier 14 which is fitted in the recess 11 and engages the opposite sides thereof.

When the driving sleeve is rotated, for example, in the direction indicated by arrow in Fig. 4, the pawls 6 are rocked to engage them with the shaft as shown. Assuming now that one of the shafts runs ahead of the other, as would happen if the shafts 1 and 2 were the axles of a motor vehicle turning a corner, the ratchet tooth engaged by pawl rides under the pawl and rocks it to the neutral position against the tension of the end of the spring bar to which it is connected. The shaft then rotates under the pawl until the next ratchet tooth comes under the pawl. This again rocks the pawl and the process is repeated as long as the axle continues to rotate faster than the sleeves. Oppositely directed teeth are employed arranged in pairs to provide for backward as well as forward drive, and a plurality of pairs are preferably employed to provide for a quick picking up of the shaft when the driving sleeve is rotated.

It is not desirable for heavy work that the sole driving connection between the sleeve 12 and the sleeve 3 should be through the medium of the spring rod 13. I therefore form a longitudinal slot 15 in the inner sleeve into which projects a key 16 formed on or connected to the outer sleeve, the key being narrower than the slot so that before the key engages the side of the slot sufficient relative movement of the two sleeves has taken place to permit of the rocking of the pawls as hereinbefore referred to. The driving sleeve may itself be driven in any desired manner. I show for this purpose the bevel gearing 17.

What I claim is:—

1. In a differential drive the combination of two alined rotatable parts; an inner sleeve concentric therewith; two double pawls pivoted in said sleeve, one for each of said rotatable parts; adjacent oppositely directed ratchet teeth formed in each of said parts; a driving sleeve fitted over the first mentioned sleeve having a longitudinal recess formed therein next to said inner sleeve; arms extending from the pawls into said recess; a spring bar extending longitudinally of said recess and connected adjacent its ends to said arms; and a connection between the middle of the spring bar and the driving sleeve.

2. In a differential drive the combination of two alined rotatable parts; an inner sleeve concentric therewith; two double pawls pivoted in said sleeve, one for each of said rotatable parts; adjacent oppositely directed ratchet teeth formed in each of said parts; a driving sleeve fitted over the first mentioned sleeve having a longitudinal recess formed therein next to said inner sleeve; arms extending from the pawls into said recess; a spring bar extending longitudinally of said recess and connected adjacent its ends to said arms; a connection between the middle of the spring bar and the driving sleeve; and means limiting the relative rotary movement of the two sleeves.

3. A drive connection comprising a shaft; an inner sleeve rotatable on the shaft; an outer sleeve rotatable on the inner sleeve, having a recess formed therein adjacent said inner sleeve; a double pawl pivoted in said inner sleeve; adjacent oppositely directed ratchet teeth formed in the shaft; an arm on said pawl extending through the inner sleeve into the recess in the outer sleeve; and a spring connection between the outer sleeve and said arm tending to retain said arm in a given position relative to the sleeve.

4. A drive connection comprising a shaft; an inner sleeve rotatable on the shaft; an outer sleeve rotatable on the inner sleeve, having a recess formed therein adjacent said inner sleeve; a double pawl pivoted in said inner sleeve; adjacent oppositely directed ratchet teeth formed in the shaft itself; an arm on said pawl extending through the inner sleeve into the recess in the outer sleeve; a spring connection between the outer sleeve and said arm tending to retain said arm in a given position relative to the sleeve; and means limiting the relative rotary movement of the two sleeves.

5. A drive connection comprising a shaft; an inner sleeve rotatable on the shaft and having a longitudinal recess of segmento-cylindrical form formed therein next the shaft; a segmento-cylindrical pawl closely fitted in said recess to rotate therein as a bearing and adapted to be entirely contained therein; an outer sleeve rotatable on the inner sleeve and having a recess formed therein adjacent the inner sleeve, and ratchet teeth formed directly in the shaft adapted to be engaged by the pawl; an arm extending from the pawl into said recess and adapted to be rocked by said sleeve.

6. In a differential drive the combination of two alined rotatable shafts; an inner sleeve concentric therewith; two double pawls pivoted in said sleeve, one for each of said shafts; adjacent oppositely directed ratchet teeth formed directly in each of said shafts; a driving sleeve fitted over the first mentioned sleeve having a longitudinal recess formed therein next to said inner sleeve; arms extending from the pawls into said recess; and a spring connection between each arm and the driving sleeve tending to retain said arms in a given position relative to the sleeve.

7. In a differential drive the combination of two alined rotatable parts; an inner sleeve concentric therewith; two double pawls pivoted in said sleeve, one for each of said rotatable parts; adjacent oppositely directed ratchet teeth formed in each of said parts; a driving sleeve fitted over the first mentioned sleeve having a longitudinal recess formed therein next to said inner sleeve; arms extending from the pawls into said recess; a spring bar extending longitudinally of said recess and connected adjacent its ends to said arms; and a bar carrier, fitted in the recess in the driving sleeve, to which the middle of the spring bar is connected.

Signed at Fort William, Ontario, Canada, this 25th day of April, 1924.

AARON LOUGHEED.